US012214895B2

(12) United States Patent
Godin (10) Patent No.: US 12,214,895 B2
(45) Date of Patent: *Feb. 4, 2025

(54) SYSTEMS AND METHODS FOR ENERGY TRANSPORT USING AN UNMANNED AERIAL VEHICLE

(71) Applicant: Kevin Godin, Woodbridge, VA (US)

(72) Inventor: Kevin Godin, Woodbridge, VA (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/874,496

(22) Filed: Jul. 27, 2022

(65) Prior Publication Data

US 2022/0363403 A1 Nov. 17, 2022

Related U.S. Application Data

(63) Continuation-in-part of application No. 17/574,009, filed on Jan. 12, 2022, now Pat. No. 11,434,001.
(Continued)

(51) Int. Cl.
*B64D 41/00* (2006.01)
*B64C 39/02* (2023.01)
(Continued)

(52) U.S. Cl.
CPC .............. *B64D 41/00* (2013.01); *B64D 1/12* (2013.01); *B64D 1/16* (2013.01); *B64D 1/22* (2013.01); *B64U 50/31* (2023.01); *B64D 2041/005* (2013.01); *B64D 2221/00* (2013.01); *B64U 2101/60* (2023.01)

(58) Field of Classification Search
CPC . B64D 41/00; B64D 1/12; B64D 1/16; B64D 1/22; B64D 2041/005; B64D 2221/00; B64C 39/024; B64C 39/02; B64U 2101/60; B64U 50/31; B64U 50/34; B64U 50/30; B64U 2101/45; B64U 2101/47

See application file for complete search history.

(56) References Cited

U.S. PATENT DOCUMENTS

| 4,118,299 A | 10/1978 | Maget |
| 10,145,015 B2 | 12/2018 | Carey |

(Continued)

FOREIGN PATENT DOCUMENTS

| CN | 207565841 U | 7/2018 |
| CN | 112191572 A | 1/2021 |
| WO | 2017080029 A1 | 5/2017 |

OTHER PUBLICATIONS

International Search Report and Written Opinion issued by the European Patent Office in connection with International Applicaiton No. PCT/US2022/012107, dated Mar. 29, 2022.
(Continued)

*Primary Examiner* — Yonel Beaulieu
(74) *Attorney, Agent, or Firm* — George Likourezos; Carter, DeLuca & Farrell LLP (57) ABSTRACT

An unmanned aerial vehicle ("UAV") system for energy transport includes a UAV having an energy tank configured to transport energy, a processor, and a memory. The memory includes instructions which, when executed by the processor, may cause the system to receive a first location for collecting or releasing the energy, determine an energy level of the energy tank, and transport the energy by the UAV to or from the first location based on the determined energy level.

20 Claims, 8 Drawing Sheets

Related U.S. Application Data (60) Provisional application No. 63/136,726, filed on Jan. 13, 2021.

(51) Int. Cl.
  B64D 1/12 (2006.01)
  B64D 1/16 (2006.01)
  B64D 1/22 (2006.01)
  B64U 50/31 (2023.01)
  B64U 101/60 (2023.01)

(56) References Cited

U.S. PATENT DOCUMENTS

| | | |
|---|---|---|
| 10,538,435 B2 | 1/2020 | Frolov et al. |
| 10,875,793 B2 | 12/2020 | Parkey et al. |
| D928,072 S | 8/2021 | Liang et al. |
| 11,214,486 B2 | 1/2022 | Carey |
| 11,286,058 B2 | 3/2022 | Holvey et al. |
| 11,434,001 B2 | 9/2022 | Godin |
| 2010/0101955 A1 | 4/2010 | Nocera et al. |
| 2011/0036919 A1 | 2/2011 | Baird |
| 2012/0292197 A1 | 11/2012 | Albrecht et al. |
| 2013/0206606 A1 | 8/2013 | Gilliam et al. |
| 2016/0144734 A1 | 5/2016 | Wang et al. |
| 2016/0290223 A1 | 10/2016 | Mills |
| 2017/0023394 A1* | 1/2017 | Akbar .................. B64U 10/13 |
| 2018/0229852 A1* | 8/2018 | Boss .................... B60L 53/14 |
| 2018/0319477 A1 | 11/2018 | Yakub |
| 2019/0185159 A1* | 6/2019 | Russell ................ B64U 50/38 |
| 2020/0317318 A1 | 10/2020 | Wu et al. |
| 2020/0335806 A1 | 10/2020 | Zheng et al. |
| 2021/0339858 A1 | 11/2021 | Ermanoski |
| 2022/0064030 A1 | 3/2022 | Suss et al. |

OTHER PUBLICATIONS

International Preliminary Report on Patentability issued by the International Bureau of WIPO in connection with International Application No. PCT/US2022/012107, dated Jul. 4, 2023.

* cited by examiner

SYSTEMS AND METHODS FOR ENERGY TRANSPORT USING AN UNMANNED AERIAL VEHICLE

CROSS-REFERENCE TO RELATED APPLICATIONS

The present application is a Continuation-in-Part Application of U.S. patent application Ser. No. 17/574,009, filed Jan. 12, 2022, now U.S. Pat. No. 11,434,001, which claims the benefit of and priority to U.S. Provisional Patent Application Ser. No. 63/136,726, filed on Jan. 13, 2021, the entire contents of which are hereby incorporated by reference.

TECHNICAL FIELD

The present disclosure relates to devices, systems, and methods for transporting and distributing fluid and/or energy. More specifically, the present disclosure relates to a system having an unmanned aerial vehicle for transporting and distributing fluid and/or energy.

SUMMARY

Aspects of the present disclosure are described in detail with reference to the drawings wherein like reference numerals identify similar or identical elements.

In accordance with aspects of the disclosure, an unmanned aerial vehicle ("UAV") system for fluid transportation includes a UAV having a fluid chamber for transporting a fluid, a processor, and a memory. The memory stores instructions which, when executed by the processor, cause the system to receive a first location for collecting a fluid, determine a fluid level within the fluid chamber, and transport the fluid by the UAV to the first location.

In an aspect of the present disclosure, the instructions, when executed by the processor, may further cause the system to determine if the UAV is charged to a pre-determined energy level (e.g., voltage level) sufficient to fly to the first location and deliver the fluid to the first location.

In another aspect of the present disclosure, the system may further include a photovoltaic ("PV") panel configured to collect solar energy, a desalinator, and/or a hydro cell configured to generate electricity and store energy. The UAV system includes instructions which, when executed by the processor, may further cause the system to receive a voltage from the PV panel for charging the hydro cell, determine if the hydro cell has reached a pre-determined level of charge, and move and/or fly the UAV based on the determination.

In yet another aspect of the present disclosure, the UAV system includes instructions which, when executed by the processor, may further cause the system to pass the fluid through an electrolyzer, obtain hydrogen and oxygen from the fluid, and store the hydrogen in a hydrogen tank.

In a further aspect of the present disclosure, the UAV system may further include instructions which, when executed by the processor, may further cause the system to determine if the UAV is located above the first location for fluid release, and open a valve based on the determination.

In yet a further aspect of the present disclosure, the fluid may include desalinated water and/or salt-water. The valve may be coupled to the fluid chamber.

In an aspect of the present disclosure, the UAV system includes instructions which, when executed by the processor, may further cause the system to determine if there is any fluid left in the fluid chamber, and based on the determination, fly the UAV to a fluid collection location or to a second location for fluid delivery.

In another aspect of the present disclosure, the valve may be operably connected to a pump.

In accordance with aspects of the disclosure, a method for fluid transport associated with the UAV system of the present disclosure includes receiving a first location to which a fluid is to be delivered by a UAV, determining a fluid level of the fluid within a chamber of the UAV, and transporting the fluid by the UAV to the first location for delivery of the fluid.

In an aspect of the present disclosure, the method may further include collecting solar energy to generate electricity to generate a first energy, collecting salt-water, desalinating the salt-water to generate a second energy, and charging a battery on the UAV to a pre-determined level of energy using at least one of the first energy or the second energy.

In another aspect of the present disclosure, the method may further include receiving a voltage from a PV panel to power a desalinator, passing the fluid through a desalinator, conducting electrolysis on the desalinated fluid to generate hydrogen, and storing the hydrogen in a hydrogen tank in fluid communication with the hydro cell.

In yet another aspect of the present disclosure, the method may further include determining if the UAV is charged to a pre-determined energy level sufficient to fly to the first location and delivering the fluid to or remove the fluid from the first location based on the determination.

In a further aspect of the present disclosure, the method may further include receiving a voltage from the PV panel for charging the hydro cell, determining if the hydro cell has reached a pre-determined level of charge, and initiating flight of the UAV if the pre-determined level of charge is reached.

In yet a further aspect of the present disclosure, the method may further include receiving the fluid within at least one of the hydro cell or the desalinator from the fluid chamber, obtaining hydrogen and oxygen gases from the fluid, and storing the hydrogen in a hydrogen tank.

In an aspect of the present disclosure, the method may further include determining if the UAV is located above the first location for fluid release, and opening a valve based on the determination.

In an aspect of the present disclosure, the fluid may be desalinated water or salt water, and the valve is coupled to the fluid chamber.

In yet another aspect of the present disclosure, the method may further include determining if there is any fluid left in the fluid chamber and based on the determination, flying the UAV to the first location for fluid collection or a second location for fluid delivery.

In accordance with aspects of the present disclosure, a non-transitory computer-readable storage medium storing a program for causing a controller to execute a method for fluid transport is presented. The method includes receiving a first location for collecting a fluid, by an unmanned aerial vehicle ("UAV") including a fluid chamber configured to transport the fluid, determining a fluid level of the fluid in the fluid chamber relative to a pre-determined fluid level for the fluid, and transporting the fluid by the UAV to a second location based on the determined fluid level.

In accordance with aspects of the disclosure, an unmanned aerial vehicle ("UAV") system for energy transportation includes a UAV having an energy tank for transporting energy, a processor, and a memory. The memory stores instructions which, when executed by the processor, cause the system to receive a first location for collecting or delivering energy, determine an energy level of the energy tank, and transport the energy by the UAV to or from the first location based on the determined energy level.

In an aspect of the present disclosure, the energy tank may be a flexible chamber configured to maintain a pressurized payload. Further, the energy tank may be coupled to the UAV.

In another aspect of the present disclosure, the instructions, when executed by the processor, may further cause the system to determine if there is any energy left in the energy tank, and based on the determination, fly the UAV to the first location for energy collection or a second location for energy delivery.

In yet another aspect of the present disclosure, the energy may be hydrogen, and the UAV system may further include a connection nozzle operably connected to the energy tank. Further, the instructions, when executed by the processor, may further cause the system to determine if the UAV is located above the first location for energy collection, and interlock the connection nozzle to a collection site at the first location based on the determination.

In a further aspect of the present disclosure, the connection nozzle may include a male and female interlocking connector to operably connect the connection nozzle to the collection site or a delivery site.

In yet a further aspect of the present disclosure, the connection nozzle may be a gas connection nozzle, a diffusion nozzle, and/or a fueling nozzle.

In an aspect of the present disclosure, the instructions, when executed by the processor, may further cause the system to determine if the UAV is charged to a pre-determined energy level sufficient to fly to the first location, and deliver the energy to or remove the energy from the first location based on the determination.

In another aspect of the present disclosure, the energy level of the energy tank may be determined relative to a pre-determined energy level for the energy.

In yet another aspect of the present disclosure, the energy tank may be configured to be interchangeable with a fluid chamber, and the fluid chamber may include a more rigid material relative to the energy tank.

In accordance with aspects of the disclosure, a method for energy transport may include receiving a first location for collecting energy, by an unmanned aerial vehicle ("UAV") including an energy tank configured to transport the energy, determining an energy level of the energy in the energy tank relative to a pre-determined energy level for the energy, and transporting the energy by the UAV to a second location based on the determined energy level.

In an aspect of the present disclosure, the method may further include determining if there is any energy left in the energy tank, and based on the determination, flying the UAV to the first location for energy collection or a second location for energy delivery.

In another aspect of the present disclosure, the energy tank may be a flexible chamber configured to maintain a pressurized payload, and the energy tank may be coupled to the UAV.

In yet another aspect of the present disclosure, the energy may be hydrogen, and the method may further include determining if the UAV is located above the first location for energy collection, and interlocking the connection nozzle to a collection site at the first location based on the determination.

In a further aspect of the present disclosure, interlocking the connection nozzle to the collection site may further include operably connecting a male and female interlocking connector.

In yet a further aspect of the present disclosure, the connection nozzle may be a gas connection nozzle, a diffusion nozzle, and/or a fueling nozzle.

In an aspect of the present disclosure, the method may further include determining if the UAV is charged to a pre-determined energy level sufficient to fly to the first location, and delivering the energy to or remove the energy from the first location based on the determination.

In another aspect of the present disclosure, the energy level of the energy tank may be determined relative to a pre-determined energy level for the energy.

In yet another aspect of the present disclosure, the energy tank may be configured to be interchangeable with a fluid chamber, and the fluid chamber may include of a more rigid material relative to the energy tank.

In a further aspect of the present disclosure, the method may further include using the energy tank as a floatation device at a first location, and the energy tank floating about a surface of a body of water while the UAV awaits a second location.

In accordance with aspects of the disclosure, a non-transitory computer-readable storage medium storing a program for causing a controller to execute a method for energy transport is presented. The method includes receiving a first location for collecting energy, by an unmanned aerial vehicle ("UAV") including an energy tank configured to transport the energy, determining an energy level of the energy in the energy tank relative to a pre-determined energy level for the energy, and transporting the energy by the UAV to a second location based on the determined energy level.

Further details and exemplary aspects of the present disclosure are described in more detail below with reference to the figures. Any of the aspects of the present disclosure may be combined with other aspects without departing from the scope of the present disclosure.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

DETAILED DESCRIPTION

The present disclosure relates to devices, system and methods for fluid and/or energy transportation and distribution using an unmanned aerial vehicle ("UAV").

Although the present disclosure will be described in terms of specific aspects, the present disclosure will be readily apparent to those skilled in this art that various modifications, rearrangements, and/or substitutions may be made without departing from the spirit of the present disclosure. The scope of the present disclosure is defined by the claims appended hereto. For example, the present disclosure will be described encompassing one UAV, however, it is contemplated that the system may include multiple UAVs or even an unmanned land vehicle. Using manned aircraft or vehicles is also contemplated in accordance with the present disclosure, such as, for example, manned vertical takeoff and landing ("VTOL") aircraft or vehicles.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Generally, unmanned systems having an unmanned vehicle (e.g., systems typically having a robot, controllers, station, or base) may be limited by the battery capacity and/or the location of the charging station associated with the unmanned vehicle. Most unmanned vehicles lack compartments to store fluids and means to generate energy. As the unmanned vehicle moves (e.g., a UAV flies), the battery discharges or the source of power may reduce the amount of outputted power, and at a certain point, the unmanned vehicle must recharge (e.g., a UAV lands for recharging).

The present disclosure provides a novel system and method for powering an unmanned vehicle and ultimately transporting energy and/or fluid. The system and method generally involve collecting, processing, and transporting energy and/or fluid, which may be used in scenarios such as charging machinery, powering buildings, irrigating land, extinguishing fires and/or other scenarios where using an unmanned vehicle without the need of a charging station may be contemplated. The systems and methods provided in the present disclosure can be used to collect and process a fluid, for example, to desalinate and collect a fluid such as water (e.g., seawater). The fluid, before or after a selected process (e.g., desalination) may be used for power generation (e.g., to generate energy to power the unmanned vehicle) and/or irrigation of a selected area. For example, the system may include an unmanned vehicle, which may be configured to fly and irrigate a vegetable plantation in a controlled manner (e.g., through a controlled drop), and/or configured to drop water above a house or a forest fire. It is contemplated that the system may provide pre-emptive irrigation and/or irrigation in a responsive capacity.

In aspects, elements that may be associated with the functional enablement of elements to the UAV, desalinator, hydro cell, and the PV panel may not be described in detail (e.g., screws, wires, circuitry, connectors, etc.). However, some examples may be noted. The desalinator and/or the hydro cell and/or the PV panel may be described to an extent as to enable the functionality of the described aspects yet may not be described in detail.

Figure 1:
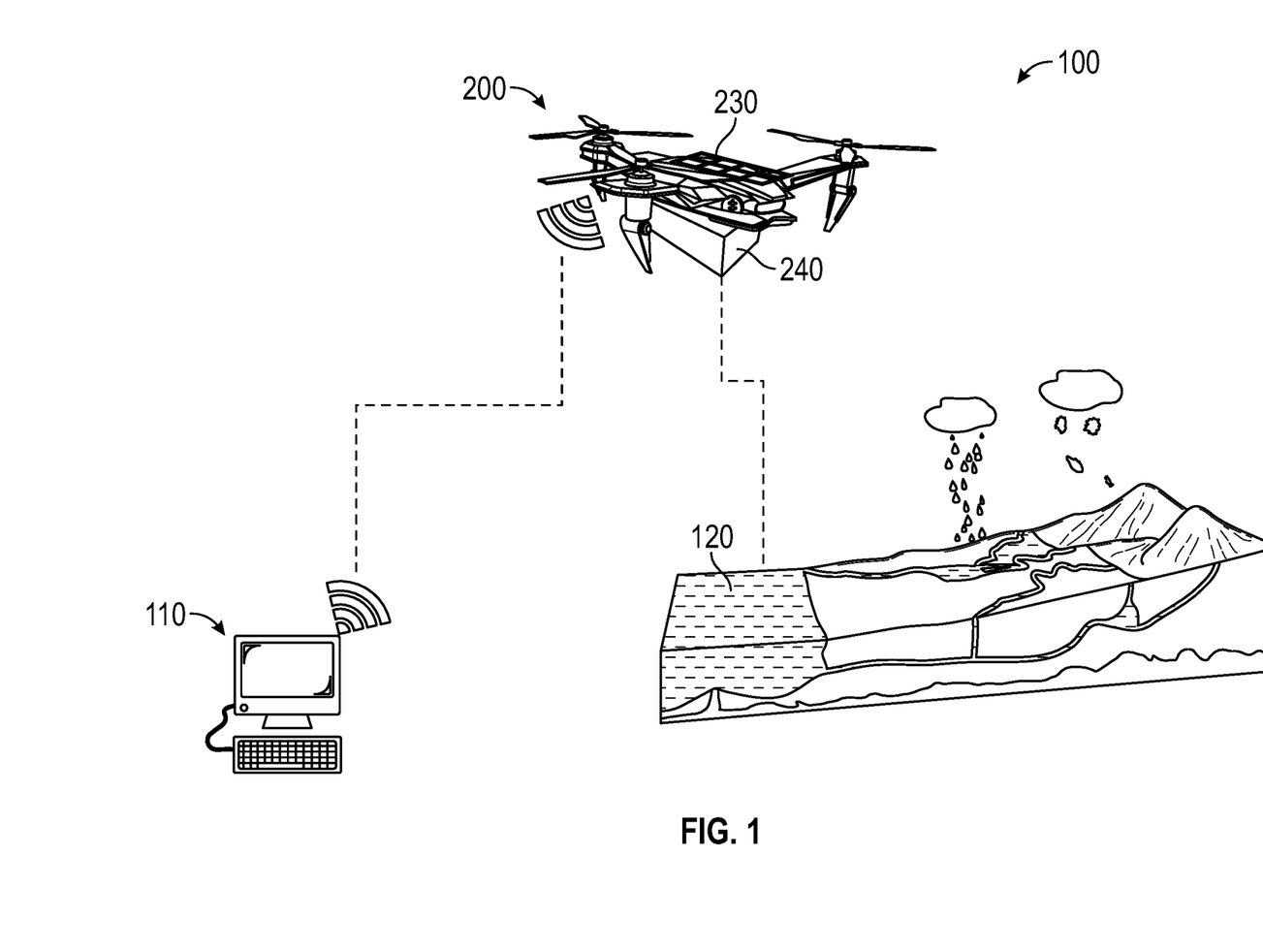
FIG. 1 is a diagram illustrating a system for transporting a fluid in accordance with the present disclosure.
Figure 2:
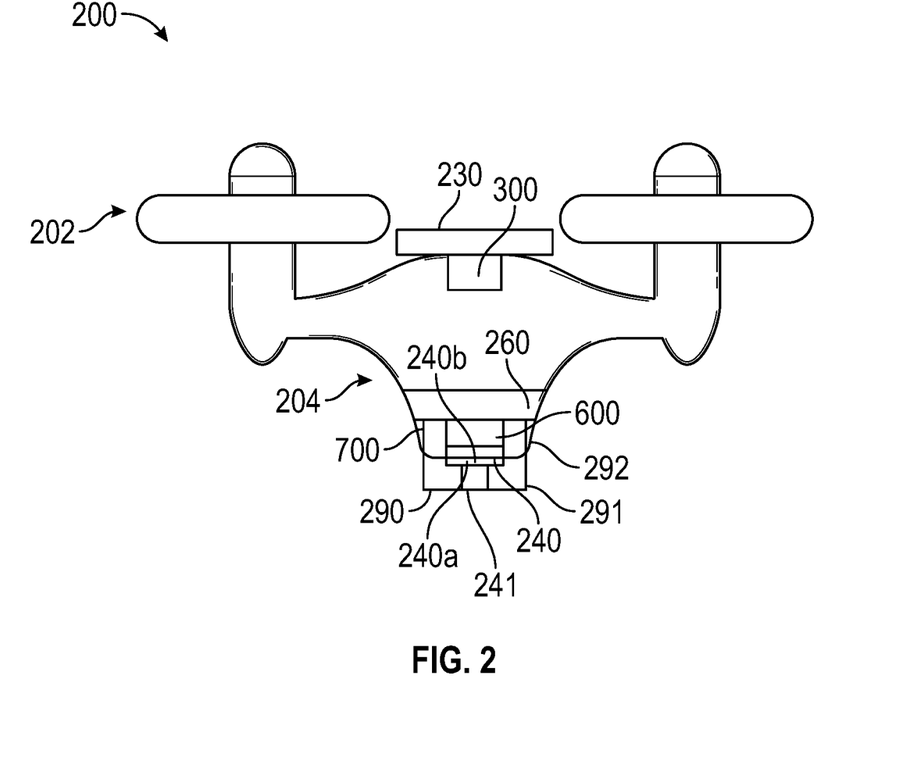
FIG. 2 is a diagram illustrating a UAV in accordance with the present disclosure.

Referring to FIGS. 1 and 2, an exemplary unmanned system UAV system 100 is shown. The UAV system 100 generally includes a UAV 200 (e.g., a helidrone) configured to collect and transport a fluid 120 (e.g., seawater or fresh water). In aspects, the UAV 200 of the present disclosure may be a commercially available flying robot, VTOL or other vehicle. The UAV system 100 may generate electricity (e.g., by solar desalination and/or by a desalination battery), for example, to power and/or charge the UAV 200.

In aspects, the UAV 200 may include a controller 300, a desalinator 600 configured to process the fluid 120, and/or a hydro cell 700.

The desalinator 600 is configured to process seawater or brine to produce a low-salt content water. In aspects, the desalinator 600 may also be part of an energy generation system of the UAV 200. For example, the desalinator 600 may include a solar desalinator, and/or a desalination battery. Solar desalination is a technique to produce water with a low salt concentration from seawater or brine using solar energy. Solar desalination may operate using direct heat from the sun or using electricity generated by solar cells to power a membrane process. For a detailed description of solar desalination, one or more aspects of which may be included or modified for use with the disclosed aspects, reference may be made to U.S. Pat. No. 10,538,435, the entire contents of which are incorporated herein by reference. A desalination battery is an aqueous energy storage device for the use of seawater deionization. The desalination battery, which generally consists of sodium and chloride dual-ion electrochemical electrodes, is an aqueous energy storage device for the use of seawater deionization. The desalination battery uses an electrical energy input (e.g., solar power) to extract sodium and chloride ions from seawater or brine and to generate fresh water. The desalination battery operates in a similar way to capacitive desalination techniques, but instead of storing charge in an electrical double layer (e.g., built at the surface of the electrode) it is held in the chemical bonds (e.g., in the bulk of the electrode material). In aspects, the process for separating seawater into fresh water and brine streams may include immersing fully charged electrodes in seawater, which do not contain mobile sodium or chloride ions when charged. Next, a constant current is applied to the electrodes in the solution in order to remove the ions from the solution. Next, the freshwater solution is extracted from the cell and the fresh water solution is replaced with additional seawater. Next, the electrodes are recharged in this solution, releasing ions, and creating brine. Finally, the brine solution is replaced with new seawater, and the desalination battery is ready for the next cycle. For a detailed description of a desalination battery, one or more aspects of which may be included or modified for use with the disclosed aspects, reference may be made to U.S. Pat. No. 10,822,254, the entire contents of which are incorporated herein by reference.

In aspects, the UAV system 100 may further include at least one supplemental battery (not shown) configured to store energy. The supplemental battery may include a lithium-based battery, for example, a lithium polymer battery. The supplemental battery (not shown) may be operably connected to a device that converts other energy forms (e.g., a PV collecting solar energy which can be converted into electricity) into mechanical energy, e.g., a motor (not shown). In further aspects, the supplemental battery (not shown) may be operably connected to the desalinator 600, the hydro cell 700, and/or the UAV 200.

Figure 4:
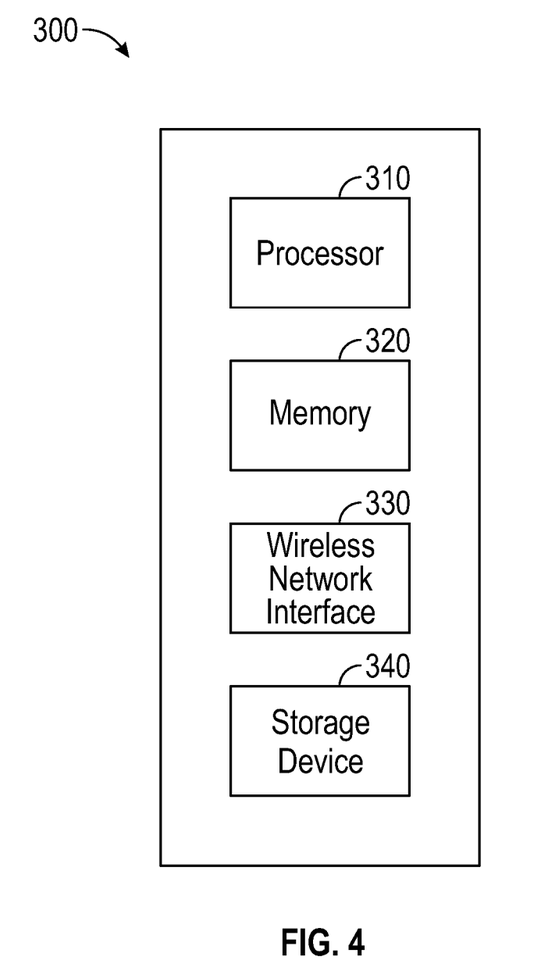
FIG. 4 is block diagram illustrating components of a controller in accordance with the present disclosure.

In aspects, the UAV system 100 may be configured for receiving and/or storing location data (e.g., location data in the form of GPS coordinates) and pre-determined fluid characteristics (e.g., salt content of water) in a memory 320

(FIG. 4). In aspects, the UAV system 100 may be configured to interpret mapping software techniques that may aid in identifying and/or interpreting various terrains, flying paths, optimal irrigation patterns, environmental conditions and/or configurations. Thus, the UAV system 100 may include one or more sensors configured to collect environmental conditions. For example, a rain sensor may be configured to detect rain, and/or a GPS may be configured to detect features defining a specific area, (e.g., mountains and windmills), and communicate the results to the controller 300.

Figure 3:
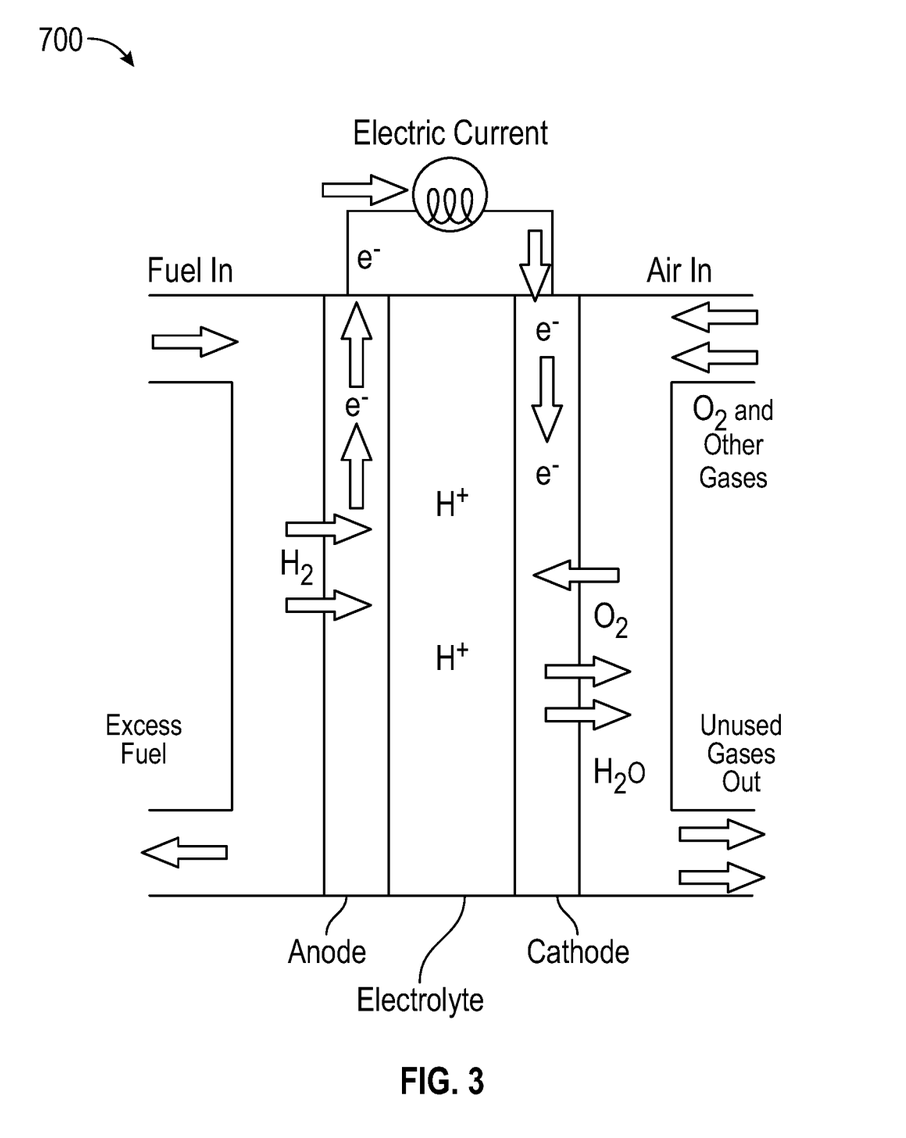
FIG. 3 is a diagram depicting a hydro cell of the UAV system of FIG. 2 in accordance with the present disclosure.

Referring to FIG. 3, a hydro cell 700 is shown. The hydro cell 700 is an electro chemical cell that converts chemical energy of hydrogen to an oxidizing agent (e.g., oxygen). Generally, the hydro cell 700 includes an anode, a cathode, and an electrolyte (e.g., salt-water) that enables ions to move between the two sides of the hydro cell 700. At the anode, a catalyst (e.g., platinum) causes the fuel to undergo oxidation reactions that generate ions (often positively charged hydrogen ions) and electrons. The ions move from the anode to the cathode through the electrolyte (e.g., salt water). At the same time, electrons flow from the anode to the cathode through an external circuit, producing direct current electricity.

With reference to FIGS. 1 and 2, the UAV 200 may include PV panel 230, fluid chamber 240, and energy tank 260. The PV panel 230 may be of any suitable size to generate power for storage and/or use by the UAV system 100. The fluid chamber 240 is configured to store a fluid 210, such as fresh or desalinated water. The fluid chamber 240 may include two or more sub-chambers 240a, 240b. For example, a first sub-chamber 240a, may be configured to hold fresh water (e.g., desalinated water), while the second sub-chamber may be configured to hold salt-water. The fluid chamber 240 may include an automated release valve configured to enable the release or entry of water to a body of water or release of water to a destination (e.g., a field for irrigation).

In aspects, the UAV system 100 may be configured to conduct an electrolysis process such as separating a fluid into oxygen and hydrogen gases and ultimately transporting the fluid(s) to a location (e.g., a first location). For example, the electrolysis process may include a polymer electrolyte membrane (PEM) electrolyzer. Water reacts at the anode to form oxygen and positively charge hydrogen ions (protons). The electrons flow through an external circuit and the hydrogen ions selectively move across the PEM to the cathode. The energy tank 260 may be operably connected to the hydro cell 700 and configured to store hydrogen, which may be generated as a by-product after the fluid 120 is processed at the hydro cell 700. The hydrogen generated from the electrolysis of the fluid 120 may be used to power the UAV 200. The energy tank 260 may be similar in shape and/or configuration to a gas holding tank, e.g., a spherical and/or bulbous design. In aspects, the spherical and/or bulbous design may aid the UAV 200 with buoyancy when the tank is resting in water. In aspects, the energy tank 260 may be a container of any kind or shape capable of storing a gas and/or liquid.

In aspects, the UAV 200 may be configured to be stationary at a first location (e.g., the UAV 200 may be waiting for instructions while floating in the ocean, similar to a buoy) prior to, during, or after fluid collection (e.g., the UAV 200 may be configured to wait for a pre-determined event while sitting on the ocean or other body of water). The UAV 200 is configured to collect the fluid 120 and receive the fluid 120 in the fluid chamber 240 (e.g., by a pump 292 of the UAV, or by opening the automated release valve 241). For example, the UAV 200 can be configured to collect fluid such as water from the ocean while waiting for instructions, which may depend on a pre-determined task (e.g., if instructed, travel to a field which requires irrigation and deliver the fresh water). For example, the UAV may sit strategically for an indefinite period of time in a given location waiting for instructions. In aspects, the UAV may be on stand-by while floating in the ocean, similar to a buoy. For example, the UAV 200 may be configured to deliver water to an agricultural area, to aid agricultural productivity and the local environment/ecosystem.

In aspects, the PV panel 230 may be operably connected to the desalinator 600 to desalinate a fluid. As noted above, the desalinator 600 of the system 100 can be configured to desalinate a fluid having salt (e.g., seawater). The desalinator 600 may utilize solar energy collected via the PV panel 230. In aspects, the UAV 200 may be configured to wait in the ocean while gathering energy from the sun and/or collecting ocean water. In aspects, the PV panel 230 may be connected to an energy storage element (e.g., a battery) from which energy may be drawn to power the UAV 200. For example, an energy storage element (e.g., a battery) may be configured to power a motor (not shown) configured to drive a selected element of the UAV 200 (e.g., a propeller or roto-fan).

As noted above, the UAV system 100 may include fluid chamber 240. In aspects, after a pre-determined amount of fluid 120 (e.g., seawater) is collected in the fluid chamber 240, the UAV system 100 may enable the UAV 200 to transport the fluid 120 to a desired location (e.g., a house on fire). Thus, the fluid chamber 240 may be configured to host a fluid having salt (e.g., seawater). In further aspects, the fluid chamber 240 may be operably connected to the hydro cell 700 and/or the desalinator 600 and configured for receiving fresh water from the hydro cell 700 and/or the desalinator 600.

In aspects, the UAV system may pump salt water (e.g., via the pump 292 of the UAV system 100) to the hydro cell 700 and/or the desalinator 600. For example, a fluid path (not shown) may be defined between the fluid chamber 240, the desalinator 600, and/or the hydro cell 700. In aspects, the fluid path (not shown) may be a closed-loop path. In further aspects, the fluid chamber 240 can be configured to receive a fluid from the environment (e.g., from a lake, rainwater, or the ocean) prior to and/or post-processing of the fluid. For example, the fluid chamber 240 may be part of a closed-loop fluid path (not shown) in fluid communication with the external environment (e.g., the fluid chamber 240 may be configured to receive water from a lake and water leaving the desalinator 600). In further aspects, the fluid chamber 240 may be configured to collect rainwater.

In aspects, the fluid chamber 240 may be disposed at a selected portion of the UAV 200. For example, the fluid chamber 240 may be connected to lower portion 204 of the UAV 200 such that a user may be able to disconnect the fluid chamber 240, or the fluid chamber 240 may be monolithically formed with the UAV 200. In aspects, the fluid chamber 240 may be configured to collect and store a fluid (e.g., seawater) and may include a valve 290 in fluid communication with the fluid chamber 240.

Generally, the valve 290 is configured for selective passing of the fluid therethrough and into the fluid chamber 240.

In aspects, the UAV system 100 may include additional valves, e.g., valves to control fluid communication between elements mounted and/or monolithically formed in the UAV 200 (e.g., a valve may be disposed between the desalinator 600 and the fluid chamber 240, when in fluid communication). In aspects, the fluid chamber 240 may be configured to include a selected shape (e.g., a bulbous plastic water container shaped like a buoy).

In aspects, the fluid chamber 240 may act as a buoy for the UAV 200. In some aspects, the fluid chamber 240 and/or the valve 290 may be configured for collecting/releasing a selected fluid based on a selected determination. In another example, the UAV system may be configured to determine if the UAV 200 has arrived at a particular location (e.g., by comparing a GPS location of the UAV to the particular location). In aspects, the UAV system 100 may include a second fluid chamber 291, which can be configured to receive a selected fluid. For example, the second fluid chamber 291 may be configured to receive desalinated water after ocean water has been desalinated via the desalinator 600. In some aspects, the second fluid chamber 291 may be in fluid communication with the fluid path (not shown) noted above.

In aspects, the fluid chamber 240 may be configured to receive a selected fluid after desalination. For example, the fluid chamber 240 may be operably connected to the desalinator 600 such that the system 100 feeds salt-water to the desalinator 600 from the fluid chamber 240. Generally, the desalinator 600 processes the salt-water by substantially removing the salt from the salt-water and ultimately generates energy, e.g., desalinator 600 may be configured as a sodium ion desalination battery, which may include a membrane.

After the salt-water or seawater is processed, the processed water may be removed from the UAV 200 and fed back into the body of salt-water (and/or stored in the second sub-chamber 240b). Further, after the water is processed, the processed water can be fed to the hydro cell 700 from the desalinator 600.

Turning now to FIG. 4, a block diagram illustrating aspects of an exemplary controller (e.g., controller 300) of UAV system 100 is shown. The controller 300 generally includes a processor 310, memory 320, a wireless network interface 330, and a storage device 340. The memory 320 may include instructions that, when executed by the controller 300, may cause the UAV system 100 to execute the methods disclosed herein.

In various aspects, the memory 320 may include random access memory, read-only memory, magnetic disk memory, solid-state memory, optical disc memory, and/or another type of memory. In various aspects, the memory 320 can be separate from the controller 300 and can communicate with the processor 310 through communication buses of a circuit board and/or through communication cables such as serial ATA cables or other types of cables. The memory 320 includes computer-readable instructions that are executable by the controller 300 to operate the controller 300.

In various aspects, the controller 300 may include a wireless network interface 330 to communicate with other computers or a server (not shown). In aspects, a storage device 340 may be used for storing data. In various aspects, the controller 300 may be, for example, without limitation, a digital signal processor, a microprocessor, an ASIC, a graphics processing unit ("GPU"), field-programmable gate array ("FPGA"), or a central processing unit ("CPU").

Figure 5:
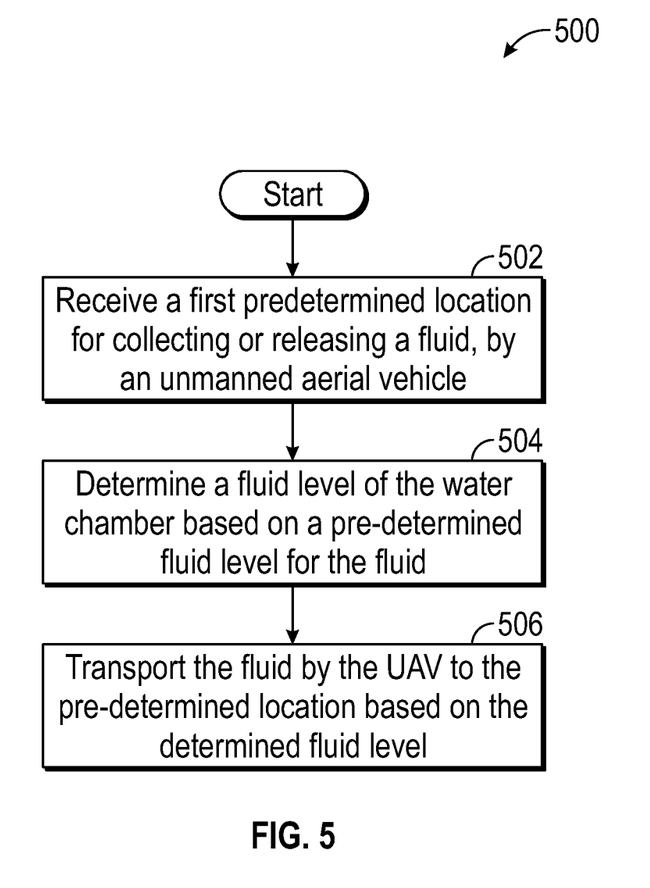
FIG. 5 is a flow diagram for a method for fluid transport in accordance with the present disclosure.

Referring to FIG. 5, a flow diagram for a method of fluid transport is shown as 500. FIG. 5 shows a flow chart of an exemplary computer-implemented method 500 for location-based and fluid transportation in accordance with aspects of the present disclosure.

Although the steps of FIG. 5 are shown in a particular order, the steps need not all be performed in the specified order, and certain steps can be performed in another order. For example, FIG. 5 will be described below with a server (not shown) performing the operations. However, in various aspects, the operations of FIG. 5 may be performed all or in part by the controller 300 of FIG. 4. In aspects, the operations of FIG. 5 may be performed all or in part by another device, for example, a mobile device and/or a client computer system (e.g., device 110 in FIGS. 1 and 6). These variations are contemplated to be within the scope of the present disclosure.

Initially, at step 502, the UAV 200 receives a first location to collect and/or release a fluid (e.g., fluid 120), by a UAV 200 (FIG. 2). The UAV 200 may be initially positioned in a body of salt-water (e.g., a bay). The UAV 200 may receive the first location via wireless communications. The first location may include, for example, a field to be irrigated and/or a location where a fire has broken out, and water is needed to put out the fire. As another example, the first location may be a flood zone from which fluid is to be collected, removed, and relocated. In aspects, the UAV 200 can remain in the body of water for a period of time and be used as a floating desalination plant.

Next, at step 504, the controller 300 determines a fluid level within the fluid chamber 240. In aspects, the controller 300 may compare the current fluid level to a stored pre-determined fluid level. For example, the pre-determined level may be any pre-determined threshold that can supply enough water for irrigation use.

Next, at step 506, the UAV travels to the first location. In aspects, the UAV may collect solar energy (e.g., collection by a PV panel) and/or fluid (e.g., water) to generate electricity to be used by the UAV 200. In aspects, the UAV may desalinate the fluid to generate electricity to power the UAV 200 and/or charge the UAV 200 to a pre-determined level of energy. The controller 300 may instruct the UAV 200 to deliver the fluid to the first location.

In further aspects, UAV 200 may receive a first location for collecting or releasing a selected fluid. For example, the controller 300 may determine a fluid level relative to a pre-determined fluid level for the selected fluid and fly to a location (e.g., a second location different from the first location). In aspects, the controller 300 may prepare the hydro cell 700 to produce electricity, determine if the UAV 200 is charged, and/or if the UAV 200 has enough power to fly to the location, prepare the UAV system 100 for fluid release, and deliver the fluid to the location.

In aspects, the controller 300 may receive a first voltage from the PV panel 230 (or a battery which may be connected to the photovoltaic panel 230) to charge, or power, the hydro cell 700 and/or the UAV 200 and/or the desalinator 600. Further, the controller 300 may determine if the hydro cell 700 has reached a pre-determined level of charge (e.g., if the UAV system 100 has enough power to desalinate salt-water, and/or if the UAV system 100 has enough power (or a selected voltage passing thereof) to produce hydrogen, or if the UAV system 100 has enough energy to fly the UAV 200 from a fluid collection location to a water delivering location).

In some aspects, the controller 300 may feed a fluid to the hydro cell 700, determine if the fluid can be used to generate a current and/or if hydrogen can be separated (or extracted) from the fluid, process the fluid by splitting the fluid into hydrogen and oxygen-based on the determination, and store the hydrogen (e.g., in energy tank 260). In various aspects, the controller 300 may determine collection of a fluid and/or determine salt in a fluid. In aspects, the controller 300 may energize the UAV 200 hydrogen stored in the energy tank 260.

The controller 300 may determine fluid communication between a fluid source (e.g., a lake, the ocean, water chamber 240) and the hydro cell 700. The controller 300 may manipulate the valve 290 based on a fluid communication determination (e.g., open the valve, or leave the valve closed).

Figure 6:
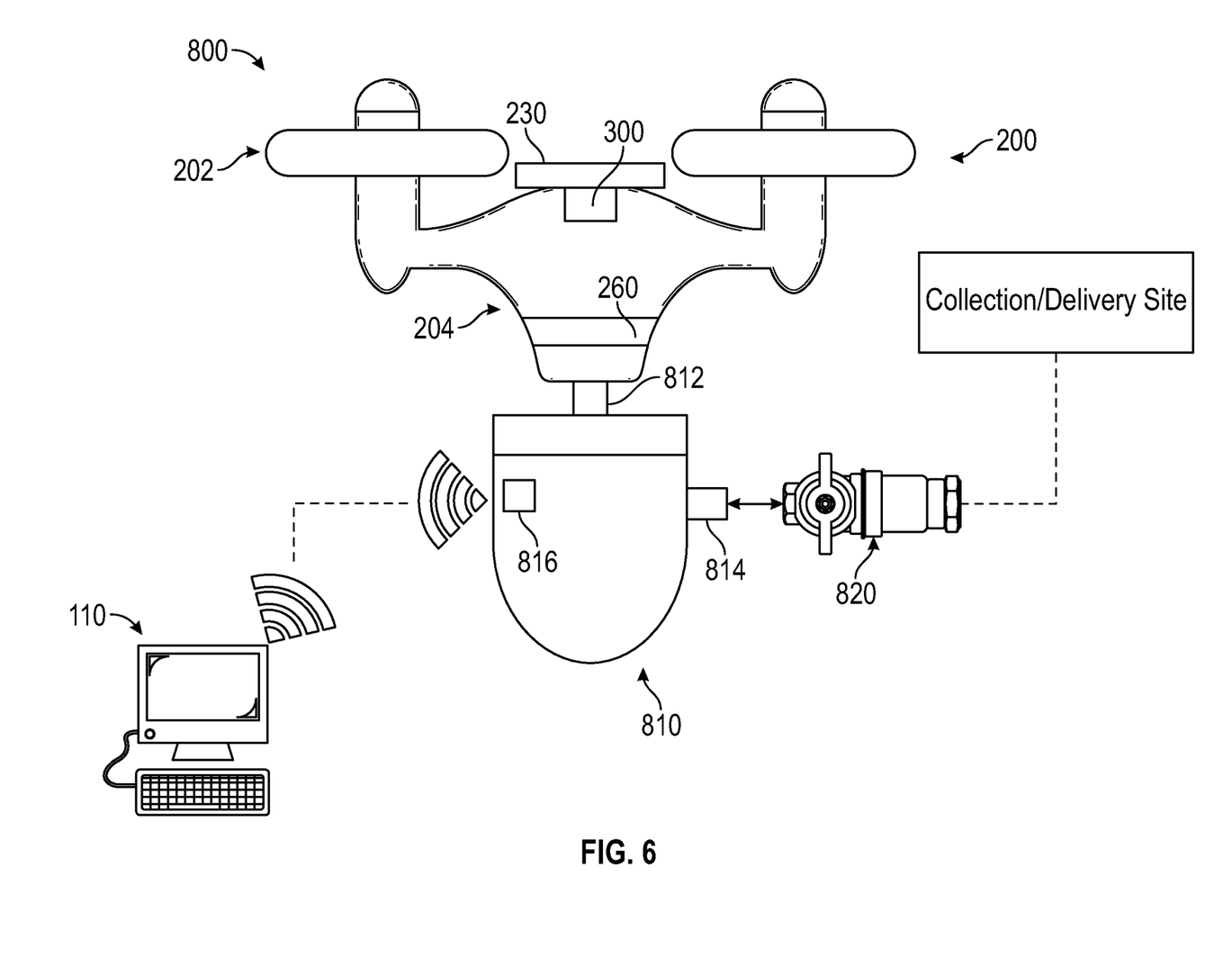
FIG. 6 is a diagram illustrating a system for transporting energy, in accordance with the present disclosure.

With reference to FIG. 6, a system for energy transport 600 is shown. The system 600 may include UAV 200 and energy tank 810 configured for the transport and storage of energy. The energy tank 810 may be configured to store a gas and/or a liquid (e.g., hydrogen, natural gas, biofuels, and/or oil), or a power supply (e.g., a battery). The energy tank 810 may be a flexible chamber, which may be configured to maintain a pressurized payload. The energy tank 810 generally includes a less rigid material than the energy tank 260 (FIG. 1), such as a polymer or other form of plastic. However, in aspects, the energy tank 810 may include more rigid materials such as metals hard plastics, and/or composites in order to maintain multiple types of payload (e.g., hydrogen and water).

The energy tank 810 may include a connection hookup 812, a connection nozzle 814, and a sensor 816. The connection hookup 812 may be configured to connect the energy tank 810 to the UAV 200. Generally, the connection hookup 812 includes a durable material, such as a metal or hard plastic, in order to support the payload of energy tank 800. In aspects, the connection hookup 812 may be a hook that easily interlocks with UAV 200 (e.g., a heavy-duty lifting hook such as an eye hook, clevis hook, or swivel hook), such that UAV 200 may connect to connection hookup 812 while in motion or idling. Connection hookup 812 is not limited to hook connectors and various alternative removable and/or permanent connection methods may be employed (e.g., nozzles, screws, and/or soldering).

The connection nozzle 814 may be any form of gas or liquid bearing nozzle. For example, the connection nozzle 814 may be a natural gas connection nozzle, a diffusion nozzle, or a fueling nozzle. In various aspects, the connection nozzle may use male and female interlocking connectors to ensure compatibility with nozzle(s) at a collection and/or delivery site 820. While the connection nozzle 814 is pictured in a tubular shape, various alternative shapes may be contemplated.

In aspects, the energy tank 810 may be connected to the lower portion 204 of the UAV 200 such that a user may be able to easily disconnect the energy tank 800. In aspects, the energy tank 810 may be interchangeable with the fluid chamber 240 of the UAV.

In aspects, the energy tank 810 may be similar in shape and/or configuration to a gas holding tank, e.g., a spherical and/or bulbous design. In aspects, the spherical and/or bulbous design may aid the UAV 200 with buoyancy when the tank is resting in water. In aspects, the energy tank 810 may be a container of any kind or shape capable of storing energy.

In aspects, the UAV 200 may be configured to be stationary at a first location (e.g., waiting for instructions while floating in the ocean, similar to a buoy) prior to, during, or after energy collection (e.g., the UAV 200 may be configured to wait for a pre-determined event while sitting on the ocean or other body of water). For example, the UAV 200 may sit strategically for an indefinite period of time in a given location waiting for instructions. The UAV may be on stand-by while floating in the ocean, similar to a buoy.

In aspects, the energy tank 810 may be configured to store electrical energy (e.g., a high-voltage electrical charge). The energy tank 810 may include a conductive metal coating (e.g., metal foil, metal film, and/or two metal plates) on an inner surface and/or an outer surface of the energy tank, and an electrode (e.g., a metal rod and/or metal wire) electrically connected to the inner surface of the energy tank 810 to permit charging. The inner surface and the outer surface may store equal but opposite charges. In aspects, the connection nozzle 814 may be an electrical connector (e.g., a plug or other suitable electrical conduit) configured to create an electrical connection with the collection and/or delivery site 820 for receiving and/or delivering electrical energy.

Figure 7:
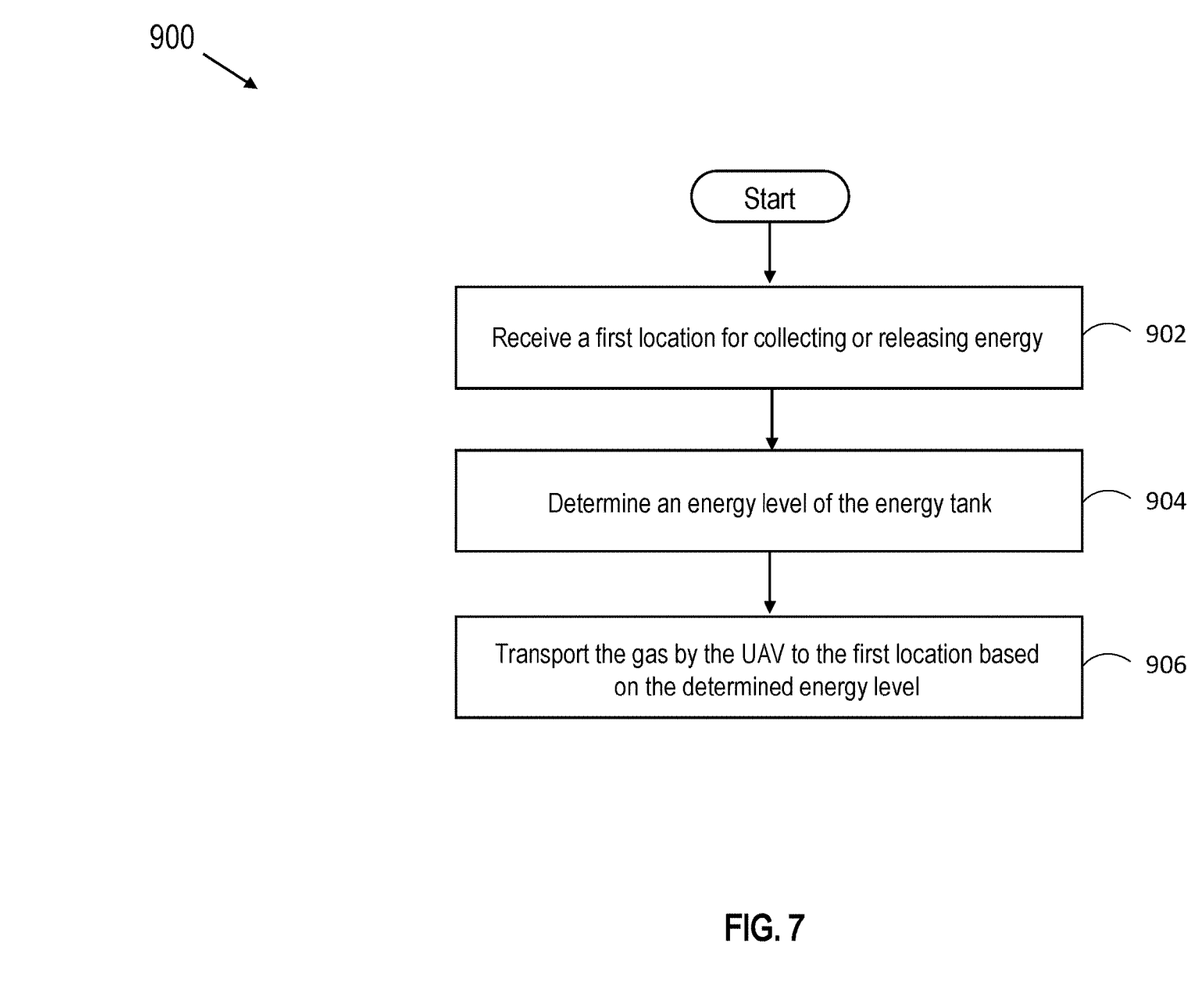
FIG. 7 is a flow diagram for a method of energy transport in accordance with the present disclosure.

Referring to FIG. 7, a flow diagram for a computer-implemented method 900 of energy transport is shown. Although the steps of FIG. 7 are shown in a particular order, the steps need not all be performed in the specified order, and certain steps can be performed in another order. For example, FIG. 7 will be described below with a server (not shown) performing the operations. However, in various aspects, the operations of FIG. 7 may be performed all or in part by the controller 300 of FIG. 4. In aspects, the operations of FIG. 7 may be performed all or in part by another device, for example, a mobile device and/or a client computer system (e.g., device 110 in FIGS. 1 and 6). These variations are contemplated to be within the scope of the present disclosure.

Initially, at step 902, the UAV 200 receives a first location to collect and/or release (i.e., deliver) energy (e.g., hydrogen, natural gas, biofuels, and/or oil). For example, the first location may be a power plant where hydrogen is ready for collection or a warehouse from which a battery is to be collected, removed, and/or relocated. In another example, the first location may be a building awaiting an energy delivery. In aspects, the UAV 200 may initially be positioned at a storage location, although any suitable location may be contemplated. The UAV 200 may then receive the first location via wireless communications (e.g., Bluetooth, Wi-Fi, or broadband) and/or an electronic order. In aspects, the UAV 200 may receive the first location from a remote server.

Next, at step 904, the controller 300 determines an energy level within the energy tank 800. In aspects, the energy level may be determined based on a reading from the sensor 816. For example, the sensor 816 may send the controller 300 a current energy level within the energy tank 800. In aspects, the controller 300 may compare the current energy level to a stored pre-determined energy level. For example, the pre-determined energy level may be any pre-determined threshold that can supply enough energy to power to a designated device at the first location (e.g., a pre-determined energy level required to power a specific machine or building). The pre-determined energy level may be determined prior to arrival at the first location via user instructions sent to controller 300. In aspects, the pre-determined energy level may be determined upon arrival at the first location. For example, sensor 816 may scan a device to determine a level of energy required to charge a device at the first location.

Next, at step 906, the controller 300 instructs the UAV 200 to travel to the first location to deliver and/or collect energy. In aspects, the UAV 200 may travel to a second location based on further instructions received from controller 300. For example, the UAV 200 may deliver energy to the first location and then travel to the second location to collect additional energy for delivery back to the first location and/or delivery to a third location.

Figure 8:
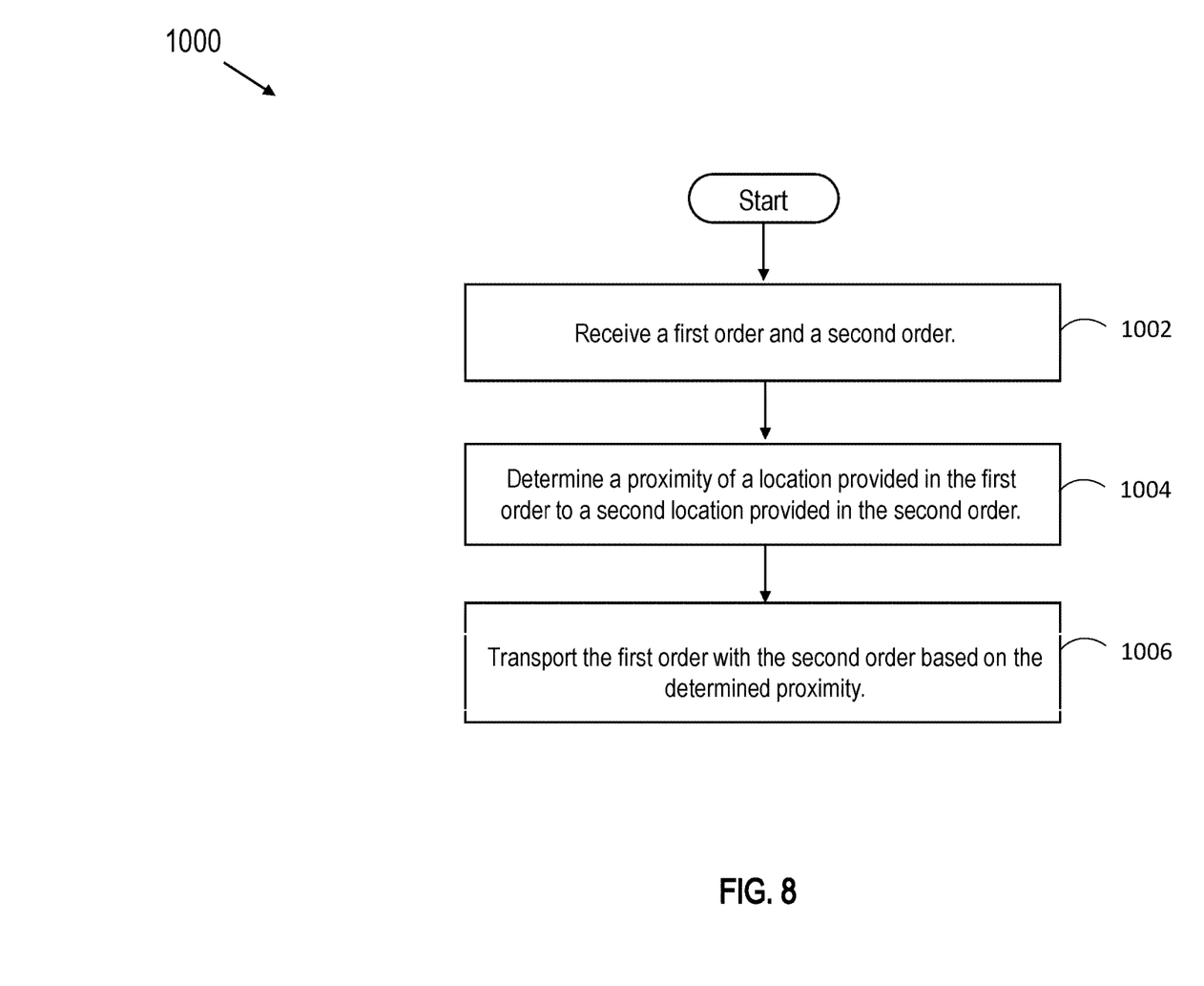
FIG. 8 is a flow diagram for a method of UAV logistics management in accordance with the present disclosure.

Referring to FIG. 8, a flow diagram for a computer-implemented method 1000 of UAV logistics management is shown. Although the steps of FIG. 8 are shown in a particular order, the steps need not all be performed in the specified order, and certain steps can be performed in another order. For example, FIG. 8 will be described below with a server (not shown) performing the operations. However, in various aspects, the operations of FIG. 8 may be performed all or in part by the controller 300 of FIG. 4. In aspects, the operations of FIG. 8 may be performed all or in part by another device, for example, a mobile device and/or a client computer system (e.g., device 110 in FIGS. 1 and 6). These variations are contemplated to be within the scope of the present disclosure.

Initially, at step 1002, the UAV 200 receives a first order and a second order. The first order and the second order may each include a location to deliver energy, fluid, and/or additional items by a UAV 200 (FIG. 2). The UAV 200 may receive the first order and the second order via wireless communications and/or through an electronic order. The first order and second order may include, for example, requests to deliver energy to particular locations and/or individuals. In aspects, the first and/or second locations may be entered by a user (e.g., a customer) with GPS delivery coordinates either numerically and/or drawn on a geospatial tool, which may later be translated into coordinates.

Next, at step 1004, the controller 300 determines a proximity of the location of the first order to the location of the second order. In aspects, the controller 300 may also translate the locations into delivery coordinates for the UAV 200 to use during navigation. For example, a pre-determined location drawn on a geospatial tool may translate to about 40.6106° N, about 73.4445° W (e.g., location data in the form of GPS coordinates).

Next, at step 1006, the controller 300 transports the first order with the second order, based on the proximity of the location of the first order to the location of the second order. For example, the locations may be the same, and therefore both orders may be transported together. In aspects, the location of the second order may be at a second location in close proximity to the location of the first order, although transportation to the second location is not limited to close proximity to the first location. In aspects, the controller 300 may also transport orders together based on time received, such as orders placed and/or orders required to be delivered within a certain timeframe (e.g., within the same hour, day, and/or week).

In aspects, a logistics management system may be used for general global positioning of UAVs and automation of UAVs. Automation may be used to coordinate procurement points, delivery points, and scenarios for UAVs in the context of adverse conditions, in order to achieve logistical efficiency and protect physical assets (e.g., to protect UAV 200 against damage and/or delay due to rough oceans, hurricanes, or floods). In aspects, the logistics management system may include fleet management components. The fleet management components may manage UAVs, infrastructure, and markets within a territory. It is contemplated that the logistics management system may cover hundreds to thousands of UAVs within a single fleet.

In aspects, the logistics management system may be configured to address hourly and/or seasonal weather changes. For example, for hourly events (e.g., naturally occurring phenomenon causing adverse conditions, such as rough seas, storms, high winds, and other atmospheric conditions), the logistics management system will ensure that locations (e.g., collection and delivery points, and/or routes between the points) do not present adverse conditions.

In aspects, method 1000 may leverage artificial intelligence ("AI") and/or various machine learning networks (e.g., convolutional neural networks and/or long-term short memory networks), to detect and/or predict the presence of adverse conditions. In aspects, the AI and/or machine learning networks may be leveraged by controller 300 for routing purposes. For example, the controller 300 may identify that a current route presents high winds that are too dangerous for UAV 200 to fly through and may reroute UAV 200 along a different path. In aspects, the AI and/or machine learnings networks may be trained using prior data from memory 320 and/or an external source (e.g., third party data or cloud storage).

In aspects, for seasonal events (e.g., the general changing of seasons causing changes in temperature, wind, and humidity), the logistics management system may ensure a gradual shift in UAV(s) service away from areas with less demand towards higher demand areas to optimize service offerings. For example, because wildfires may not occur as often in the winter, UAVs may be shifted biannually between hemispheres to avoid high presence during winter months. In aspects, gradual shifting may occur on a global scale, such that UAVs may avoid routing inefficient distances (e.g., avoid traveling across multiple states and/or countries within a short period of time). In aspects, the UAVs may be moved on demand based on user-entered parameters. For example, the UAVs may be routed to an area where a natural disaster recently occurred to provide needed fluid and energy resources.

In aspects, the fleet management components may include pairings of hemisphere territories for year-round management. For example, UAVs may only be needed during the spring and summer months for crop irrigation, and therefore will travel to designated locations of the northern hemisphere and southern hemisphere, respectively, for those seasons.

The fleet management components may include flexible territory boundaries within one or multiple regions. In aspects, the region(s) may be pre-determined (e.g., pre-programmed by a user). The flexible territory boundaries may include a pre-determined flux, which may be associated with hourly or seasonal events. For example, territories may expand in size during the winter season due to decreased demand (e.g., less UAVs are required to service demand in winter). In another example, territories may decrease during the summer season due to increased demand (e.g., more UAVs are required to service demand in summer). When territories decrease in size, additional UAVs may be employed, in order to cover the entirety of the original territory. In aspects, territory demand may be calculated based on demand per square mile and/or demand per square foot.

In aspects, the logistics management system includes UAV condition monitoring, routine UAV maintenance tracking, and/or sensor. For example, UAV condition monitoring may utilize sensor(s) (e.g., sensor 816) to detect damage to UAVs. When damage is detected, the UAV logistics management system may send the damaged UAV for repair and reroute other UAVs to cover the damaged UAV's tasks and ensure continuity of service. In aspects, routine UAV maintenance tracking may include UAVs that are unavailable due to maintenance and reroute other UAVs to cover the unavailable UAV's tasks.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the present disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Is understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the figures are presented only to demonstrate certain examples of the present disclosure. Other aspects, elements, steps, methods, and techniques that are insubstantially different from those described above and/or in the appended claims are also intended to be within the scope of the present disclosure.

What is claimed is:

1. An unmanned aerial vehicle ("UAV") system for energy transport, the UAV system comprising:
    a UAV including an energy tank configured to transport energy;
    a processor; and
    a memory, including instructions, which when executed by the processor, cause the system to:
        receive a first location for collecting or delivering energy;
        determine an energy level of the energy tank; and
        transport the energy by the UAV to or from the first location based on the determined energy level.

2. The UAV system of claim 1, wherein the energy tank is a flexible chamber configured to maintain a pressurized payload, and wherein the energy tank is coupled to the UAV.

3. The UAV system of claim 1, wherein the instructions, when executed by the processor, further cause the system to:
    determine if there is any energy left in the energy tank; and
    based on the determination, fly the UAV to the first location for energy collection or to a second location for energy delivery.

4. The UAV system of claim 3, wherein the energy is hydrogen, and the UAV system further comprises:
    a connection nozzle operably connected to the energy tank,
    wherein the instructions, when executed by the processor, further cause the system to:
        determine if the UAV is located above the first location for energy collection; and
        interlock the connection nozzle to a collection site at the first location based on the determination.

5. The UAV system of claim 4, wherein the connection nozzle includes a male and female interlocking connector to operably connect the connection nozzle to the collection site or a delivery site.

6. The UAV system of claim 4, wherein the connection nozzle is at least one of a gas connection nozzle, a diffusion nozzle, and a fueling nozzle.

7. The UAV system of claim 1, wherein the instructions, when executed by the processor, further cause the system to:
    determine if the UAV is charged to a first pre-determined energy level sufficient to fly to the first location; and
    deliver the energy to or remove the energy from the first location based on the determination.

8. The UAV system of claim 1, wherein the energy level of the energy tank is determined relative to a second pre-determined energy level for the energy.

9. The UAV system of claim 4, wherein the energy tank is configured to be interchangeable with a fluid chamber, and wherein the fluid chamber is comprised of a more rigid material relative to the energy tank.

10. A computer-implemented method for energy transport, the method comprising:
    receiving a first location for collecting energy, by an unmanned aerial vehicle ("UAV") including an energy tank configured to transport the energy;
    determining an energy level of the energy in the energy tank; and
    transporting the energy by the UAV to a second location based on the determined energy level.

11. The computer-implemented method of claim 10, further comprising:
    determining if there is any energy left in the energy tank; and
    based on the determination, flying the UAV to the first location for energy collection or to a second location for energy delivery.

12. The computer-implemented method claim 10, wherein the energy tank is a flexible chamber configured to maintain a pressurized payload, and wherein the energy tank is coupled to the UAV.

13. The computer-implemented method of claim 10, wherein the energy is hydrogen, and method further comprises:
   determining if the UAV is located above the first location for energy collection; and
   interlocking a connection nozzle to a collection site at the first location based on the determination.

14. The computer-implemented method of claim 13, wherein interlocking the connection nozzle to the collection site includes operably connecting a male and female interlocking connector.

15. The computer-implemented method of claim 13, wherein the connection nozzle is at least one of a gas connection nozzle, a diffusion nozzle, and a fueling nozzle.

16. The computer-implemented method of claim 10, further comprising:
   determining if the UAV is charged to a first pre-determined energy level sufficient to fly to the first location; and
   delivering the energy to or removing the energy from the first location based on the determination.

17. The computer-implemented method of claim 10, wherein the energy level of the energy tank is determined relative to a second pre-determined energy level for the energy.

18. The computer-implemented method of claim 10, wherein the energy tank is configured to be interchangeable with a fluid chamber, and wherein the fluid chamber is comprised of a more rigid material relative to the energy tank.

19. The computer-implemented method of claim 10, further comprising:
   using the energy tank as a floatation device at a first location,
   wherein the energy tank floats about a surface of a body of water while the UAV awaits a second location.

20. A non-transitory computer-readable storage medium storing a program for causing a controller to execute a computer-implemented method for energy transport, the computer-implemented method comprising:
   receiving a first location for collecting energy, by an unmanned aerial vehicle ("UAV") including an energy tank configured to transport the energy;
   determining an energy level of the energy in the energy tank relative to a pre-determined energy level for the energy; and
   transporting the energy by the UAV to a second location based on the determined energy level.

* * * * *